(12) United States Patent
Hahn

(10) Patent No.: US 12,509,144 B2
(45) Date of Patent: Dec. 30, 2025

(54) POWER STEERING SYSTEM FOR A WORKING MACHINE

(71) Applicant: Volvo Construction Equipment AB, Eskilstuna (SE)

(72) Inventor: Christian Hahn, Schmelz (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 283 days.

(21) Appl. No.: 17/927,946

(22) PCT Filed: Jun. 8, 2020

(86) PCT No.: PCT/EP2020/065807
§ 371 (c)(1),
(2) Date: Nov. 28, 2022

(87) PCT Pub. No.: WO2021/249614
PCT Pub. Date: Dec. 16, 2021

(65) Prior Publication Data
US 2023/0227099 A1    Jul. 20, 2023

(51) Int. Cl.
*B62D 5/32*    (2006.01)
*B62D 5/07*    (2006.01)
*B62D 5/097*   (2006.01)

(52) U.S. Cl.
CPC ............. *B62D 5/32* (2013.01); *B62D 5/07* (2013.01); *B62D 5/097* (2013.01)

(58) Field of Classification Search
CPC .................. B62D 5/097; B62D 5/32
See application file for complete search history.

(56) References Cited

U.S. PATENT DOCUMENTS 3,976,158 A * 8/1976 Shaffer ............ B62D 5/09
                                                180/417
4,190,130 A * 2/1980 Beck ............... B62D 5/32
                                                180/406

(Continued)

FOREIGN PATENT DOCUMENTS

GB     1394808 A    5/1975

OTHER PUBLICATIONS

International Search Report and Written Opinion of the International Searching Authority, PCT/EP2020/065807, mailed Feb. 25, 2021, 12 pages.

*Primary Examiner* — Alentin Neacsu
*Assistant Examiner* — Hosam Shabara
(74) *Attorney, Agent, or Firm* — Sage Patent Group

(57) ABSTRACT

The invention relates to a power steering system for a working machine, said power steering system comprising at least one steering cylinder comprising two compartments separated by a piston, a tank, a steering unit comprising a steering valve and a metering device, for supplying one compartment of the steering cylinder with a metered liquid flow, a hydraulic pump for pumping liquid from the tank to the steering unit through a supply line (SL), a return line (RL) through which the liquid flows back to the tank, a recirculation line connecting the RL to the SL, a check valve being arranged on said recirculation line to prevent liquid from flowing from the SL to the RL, two control lines, respectively connecting the steering unit to the two compartments and a liquid accumulator connected through a branch to the RL. A relief valve is arranged on the RL between the tank and an accumulator connection point.

19 Claims, 8 Drawing Sheets

(56) References Cited

U.S. PATENT DOCUMENTS

| | | | | |
|---|---|---|---|---|
| 4,217,968 A * | 8/1980 | Dezelan | ................... | B62D 5/32 |
| | | | | 60/404 |
| 4,514,152 A * | 4/1985 | Takamatsu | ............. | B62D 5/097 |
| | | | | 418/61.3 |
| 4,574,904 A * | 3/1986 | Goode | .................... | B62D 5/32 |
| | | | | 60/404 |
| 4,665,695 A * | 5/1987 | Rau | ......................... | B62D 5/07 |
| | | | | 180/441 |
| 4,781,219 A * | 11/1988 | Haarstad | ................ | B62D 5/097 |
| | | | | 137/596.13 |
| 5,080,135 A * | 1/1992 | Stephenson | ............ | B62D 5/097 |
| | | | | 137/625.24 |
| 7,837,001 B2 * | 11/2010 | Young | ..................... | B62D 5/32 |
| | | | | 180/441 |
| 10,259,493 B2 * | 4/2019 | Mate | ...................... | B62D 5/065 |
| 2014/0298798 A1 * | 10/2014 | Belshan | .................. | B62D 5/30 |
| | | | | 60/571 |

* cited by examiner

POWER STEERING SYSTEM FOR A WORKING MACHINE

CROSS REFERENCE TO RELATED APPLICATIONS

This application is a 35 U.S.C. § 371 national stage application of PCT International Application No. PCT/EP2020/065807 filed on Jun. 8, 2020, the disclosure and content of which is incorporated by reference herein in its entirety.

TECHNICAL FIELD

The invention relates to a power steering system for a working machine.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders.

BACKGROUND

In connection with transportation of heavy loads at construction sites or the like, a working machine is often used. The working machines may be utilized for transportations in connection with road or tunnel building, sand pits, mines, forestry and similar environments. Thus, a working machine is frequently operated with large and heavy loads in rough terrain and on slippery ground where no regular roads are present.

Today, most of the working machines are equipped with a power steering system that helps the driver to steer the vehicle by providing an additional steering effort, making it easier for the driver to turn. In this respect, the power steering system includes a hydraulic or electric actuator to increase the steering effort applied by the driver on the steering wheel and to reduce considerably the physical effort necessary to turn the wheels when the vehicle is stopped or moving slowly.

Power steering systems are either electric or hydraulic. Among hydraulic systems, there are the "conventional" hydraulic systems in which there is a mechanical link between the steering column and the steered wheels and the "full hydraulic" systems in which there is no mechanical link between the steering column and the wheels. In other words, a full hydraulic steering system is one in which a power steering pump pushes fluid through hydraulic hoses into and out of a steering cylinder that then turns the wheels.

Basically, the conventional hydraulic systems include a steering gear whose purpose is to reinforce the torsional movement of the steering wheel to facilitate matters for the driver. The steering wheel movement is transmitted via a steering shaft to a ball worm. The ball worm is linked to a ball nut that is attached to the bottom of a reaction piston. When the driver turns the steering wheel, it influences a valve in the steering gear and hydraulic fluid is forced under or over the reaction piston, depending on which way the driver turns the wheel. This construction is interesting in that it enables the driver to steer the vehicle even if the servo-pump (that is used for pumping fluid under or over the reaction piston) is out of action.

In a full hydraulic steering system, the steering gear is replaced by a steering unit that comprises a steering valve and a metering device, which is also known as "gerotor". This steering valve is connected to the steering column so that, when the steering wheel is moved, oil is pumped by a hydraulic pump through the steering valve and subsequently through the metering device acting as a turbine. A metered oil flow is sent to either end of a hydraulic ram (or steering cylinder). The ram forces the wheels to turn according to the rotating direction of the steering wheel.

For instance, U.S. RE 25126, U.S. Pat. Nos. 4,514,152 and 4,665,695 disclose examples of steering units.

A main advantage of a full hydraulic steering system is that it allows to build a suspension that is unencumbered by a steering linkage such as a four-link. It is also powerful for turning big tires and simple in that it does not need a drag link to connect from a frame-mounted steering gearbox to the axle.

There is a demand from the market to be able to propel working machines in a more environmentally friendly manner, e.g. by electrification of the driveline. In this respect, in an electrically driven working machine, the pump that is used for supplying the steering valve with oil is driven by an electric motor.

In accordance with the regulations, the driver must be able to control the machine in the event of an electrical failure, i.e. the steering system must be able to be maneuvered even in the event of an electrical fault occurring in driving conditions, i.e. even when the hydraulic pump is off (not working). To this end, the steering unit is designed so that, if the hydraulic pump does not deliver oil, the torque applied by the driver to the steering column is transmitted to the metering device acting as a hand pump. In such configuration, the metering device can pump the fluid from one end of the hydraulic ram and conveys it to the other end, according to a closed loop (oil does not flow from or back to the tank). This results in turning the front wheels. However, the torque to be applied by the driver to steer the vehicle is obviously much higher than that in normal operating conditions (i.e. when the hydraulic pump is operative). For example, this "manual mode" is disclosed in US 2019 039646 A. This works fine when the two compartments of the steering cylinder have the same volume (capacity). However, in a configuration in which the steering cylinder has two compartments of different volumes, it can be necessary to have oil flowing from the steering cylinder to the tank, and inversely, meaning that the steering oil system cannot work in a closed loop as mentioned above.

However, when the oil circuit is not under pressure, that is to say when the pump is not operative, the manual pump cannot be able to convey enough oil inside the compartment in expansion in order to keep it full of oil. In other words, the manual pump cannot be able to follow the movement of the steering rod, which is going too fast. Thus, there is a vacuum that is created inside the compartment in expansion. This phenomenon is called cavitation. Because of this cavitation phenomenon, the driver has the feeling that the wheels are somehow disconnected from the steering system, which is not compliant with the requirements of the concerned regulation (ISO 5010).

It is to these drawbacks that the invention more particularly intends to remedy by proposing a power steering system allowing, on the one hand, to maintain a certain level of assistance when the pump of the oil circuit is not operative and on the other hand, to avoid the cavitation phenomenon inside the steering cylinder.

In this respect, it is known from US 201810346017 A1, EP 1 312 533 B1, U.S. Pat. Nos. 6,269,903 B1, 9,867,325 B2 to arrange a liquid accumulator on the side of the supply line.

This accumulator can be used to provide the steering system with pressurized liquid when the pump is non-operational.

The problem with this type of backup system is that it requires an active control to enable the use of the accumulator only when necessary. In addition, the assistance provided by the accumulator is only temporary since it stops as soon as the accumulator is empty.

SUMMARY

An object of the invention is to provide a power steering system that can still provide an additional steering effort, even though no pressurized liquid flows in the supply line (pump not working), and that enables to avoid cavitation phenomenon when the machine is steered with the hydraulic pump off.

The object is achieved by a power steering system according to claim 1.

Thanks to the invention, the relief valve creates a back pressure inside the return line and the accumulator store a portion of pressurized oil, which makes it easier for the metering device (acting as a hand pump when there is no pressure in the supply line) to draw the liquid from the return line and to recirculate it into the system. In addition, the accumulator forms an additional source of liquid when the hydraulic pump is not working. Indeed, in such configuration, the metering device can draw liquid from the accumulator, which enables to have enough liquid flowing into the compartment of the steering cylinder that is in expansion (with respect to the position of the piston) and therefore to avoid cavitation.

Further advantages of the system are disclosed in the following description and in the dependent claims 2 to 10.

The invention also concerns a working machine as defined in the claims 11 to 14.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 2:
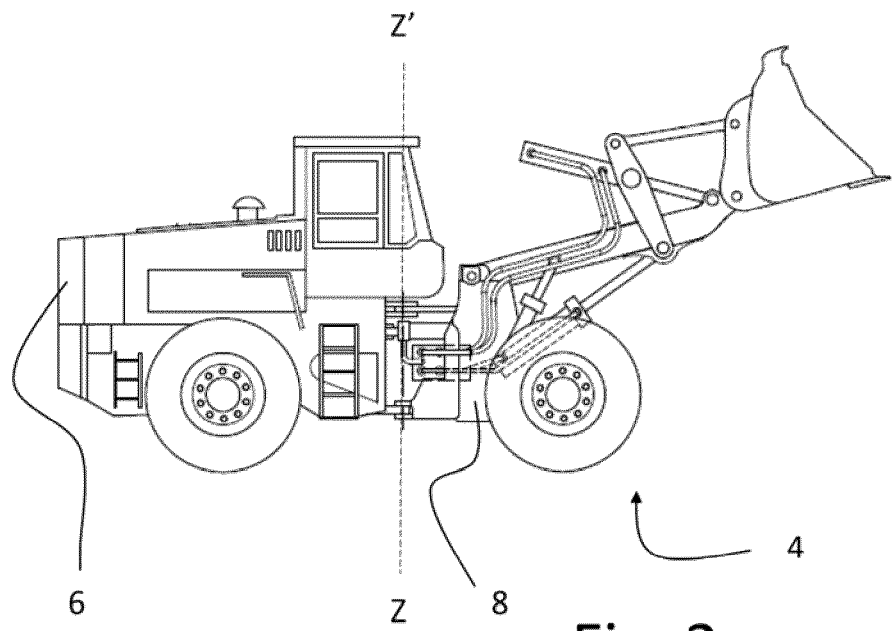
FIG. 2 is a side view of a working machine comprising the power steering system of FIG. 1.

FIG. 2 represents a working machine 4. In the example, the machine 4 is a wheel loader, in particular an articulated wheel loader. This means that the machine 4 comprises a rear unit 6 and a front unit 8 that are hinged one with the other around an axis Z-Z' that is perpendicular to the ground in a normal configuration, i.e. vertical. In other words, the machine includes an articulated joint arrangement that enables the front unit 8 to turn relative to the rear unit 6.

As its name indicates, the front unit 8 and the rear unit 6 each comprises a respective pair of wheels. Contrary to other types of heavy-duty vehicles, in an articulated wheel loader, the front axle and the rear axle do not remain parallel one with the other. One benefit of using such articulation is that the driver can maneuver in much smaller areas than wheel loaders equipped with a rigid frame. However, the invention is obviously applicable to wheel loaders equipped with a single rigid frame, in which only the front wheels pivot during a turn.

The machine 4 comprises a power steering system 2 that helps the driver to steer the vehicle by providing an additional steering effort, making it easier for the driver to turn.

The power steering system 2 includes at least one steering cylinder 10, comprising two compartments separated by a piston 11. Advantageously, the piston is attached to a piston rod 13 that is linked to the articulation joint arrangement of the machine 4. In the example, the steering cylinder 10 is a double acting cylinder, which means that each compartment can receive pressurized liquid so as to control the movement of the piston rod. In known manner, when pressurized liquid flows in one compartment, the liquid inside the other compartment flows out of the cylinder. In a variant not shown, the power steering system 2 may include two or more steering cylinders.

Figure 1:
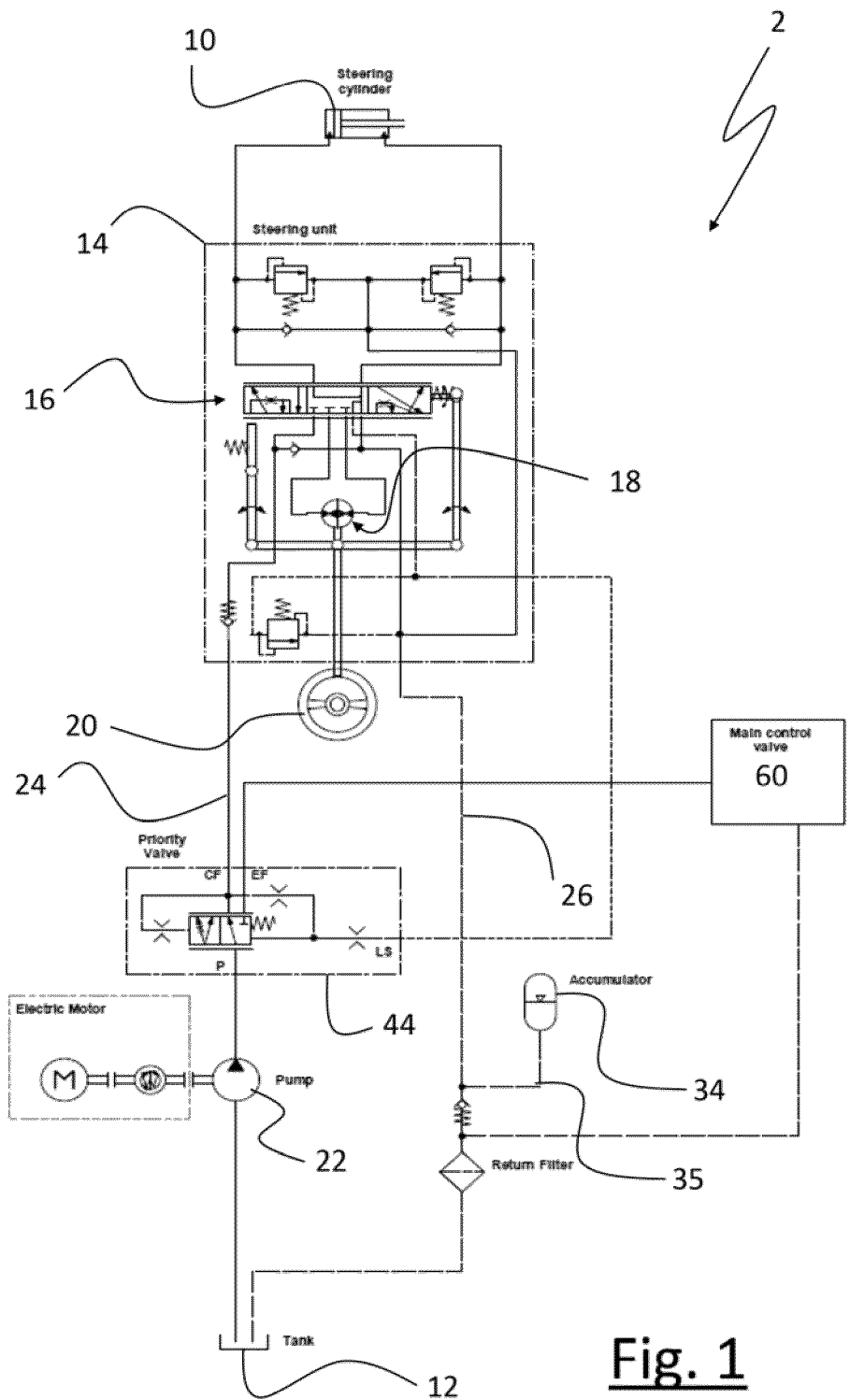
FIG. 1 is a detailed view of the power steering system of the invention.

As shown on FIG. 1, the power steering system 2 further includes a liquid tank 12, a steering unit 14, a hydraulic pump 22, for pumping liquid from the tank 12 to the steering unit 14 through a supply line 24 (also known as "pump line"), a return line 26 (also known as "tank line") through which the liquid can flow from the steering unit 14 back to the tank 12 and two control lines 30 and 32, respectively connecting the steering unit 14 to the two compartments (left and right) of the steering cylinder 10.

The power steering system 2 is a full hydraulic system in which there is no mechanical link between the steering column and the wheels. This means that the pump 22 pushes fluid through hydraulic hoses into and out of the steering cylinder 10 that then turns the front unit 8 relative to the rear unit 6.

Preferably, the liquid tank 12 is an oil tank.

In the example, the hydraulic pump 22 is the only oil pump of the working machine 4, which means that the hydraulic pump is used to supply other hydraulic systems than steering, such as the implement actuators. In this respect, and as shown on FIG. 1, the power steering system 2 further includes a priority valve 44 designed so that the hydraulic pump 22 supplies the power steering system as a priority. More precisely, the priority valve 44 is designed to allow liquid flow to other hydraulic systems than steering only when the pressure of the liquid conveyed by the pump 22 (available pressure) is greater than or equal to a specified level. When the available pressure drops below said specified level, the priority valve 44 will close, leaving flow available to the power steering actuator 10.

The priority valve 44 is well known as such, that is why it is not detailed further herein.

Advantageously, and as shown on FIG. 1, the system 2 further includes a hydraulic control valve 60 whose function is to control the implement of the machine (working tool), such as a bucket.

In the embodiment of the figures, the machine 4 includes a full electric powertrain (not shown), which means that the machine 4 does not include any internal combustion engine.

Accordingly, and as shown on FIG. 1, the hydraulic pump 22 is driven by an electric motor. Obviously, the invention is also applicable to a fuel-powered working machine in which the hydraulic pump is mechanically linked to the engine crankshaft, for example through a belt.

The steering unit 14 includes a steering valve 16 and a metering device 18, for supplying one compartment (left or right) of the steering cylinder 10 with a metered flow of liquid.

Figure 4:
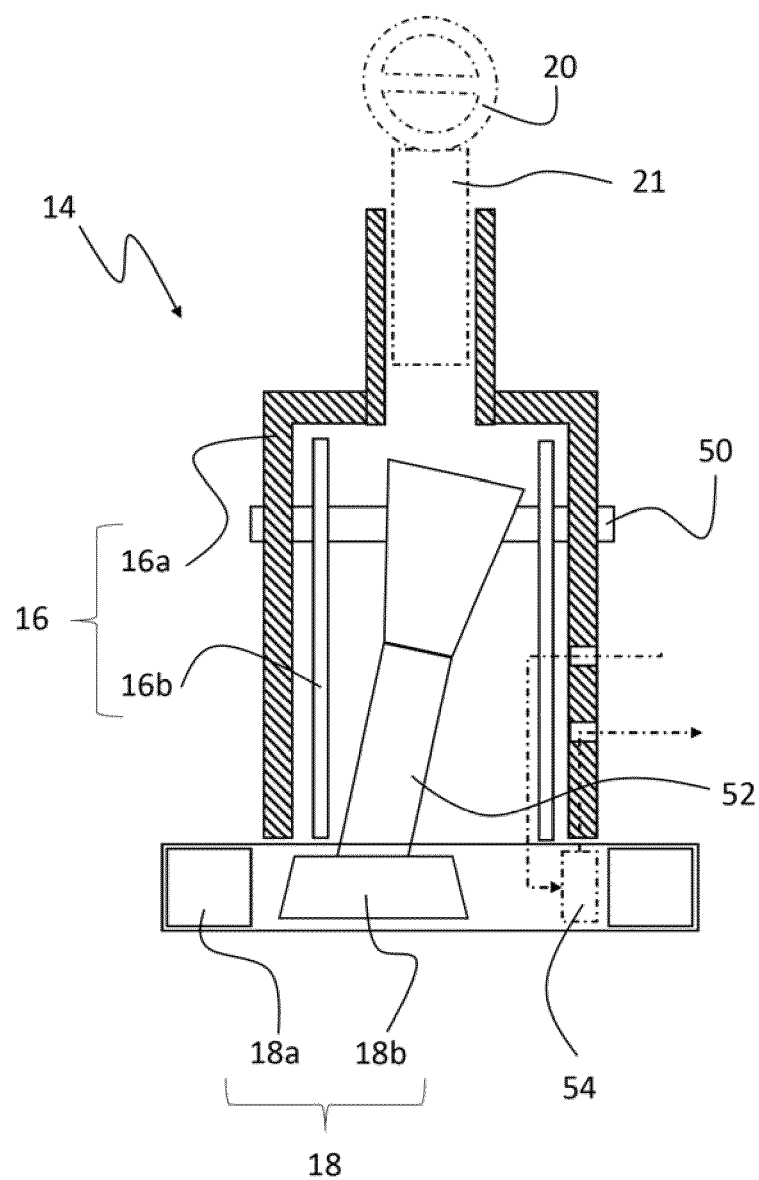
FIG. 4 is a schematic view of the hydraulic steering unit structure.

As shown in the example of FIG. 4, the steering valve 16 is a rotary valve comprising an input shaft 21 connected to a steering wheel 20.

Besides, the metering device 18 is a gerotor (which is derived from "generated rotor") consisting of an inner rotor 18b and an outer rotor 18a, The inner rotor has n teeth, while the outer rotor has n+1 teeth; with n defined as a natural number greater than or equal to 2. The geometry of the two rotors partitions the volume between them into n different dynamically-changing volumes. During the rotation cycle, each of these volumes changes continuously, so any given volume first increases, and then decreases. An increase creates a vacuum. This vacuum creates suction, and hence, this part of the cycle is where the inlet is located. As a volume decreases compression occurs. During this compression period, a fluid can be pumped. In this paper, gerotor 18 can also be designated as "gerotor mechanism".

In known manner, the rotary valve includes a housing (not shown) inside which is arranged a cylindrical spool 16a, The spool 16a can be provided with splines in which a rotary shaft 21 of a steering wheel 20 can be snugly fitted.

The spool 16a is freely rotatable inside the housing. A sleeve 16b is arranged inside the spool 16a. A transverse pin 50 rotationally couples the sleeve 16b with the spool 16a. However, the sleeve 16b delimits slots for the passage of the pin 50, which means that the spool 16a can rotate relative to the sleeve 16b over a certain angular displacement (or clearance). However, a spring mechanism (not shown) is used to return the sleeve 16b in a neutral configuration relative to the spool 16a.

The inner rotor 18b is mechanically linked to the input shaft 21. Indeed, a transmission shaft 52 (also known as "dog bone") connects the inner rotor 18b to the pin 50, and therefore to the spool 16a which, itself, is connected to the input shaft 21.

When the spool 16a and the sleeve 16b are not given any rotating force, the above-mentioned spring mechanism maintains the relative position between the spool 16a and the sleeve 16b in a neutral position.

When the spool 16a is rotated by the steering operation, the spool 16a is loosely rotated within the above mentioned clearance relative to the sleeve 16b. The rotation of the spool 16a within the clearance switches over the fluid paths to actuate the gerotor 18, with the result that the sleeve 16b is rotated in a follow-up manner.

Precisely, when the steering wheel 20 is rotated in clockwise direction (resp. counterclockwise direction), the spool 16a is rotated and forms in conjunction with the sleeve 16b a path for the passage of liquid. The pressurized liquid flows successively through a pump port and is supplied to the vacant spaces 54 between the stator 18a and the rotor 18b of the gerotor mechanism 18. The supply of the pressurized liquid into the gerotor mechanism 18 allows the rotor 18b to make an orbital motion in the clockwise direction (resp. counterclockwise direction) while rotating on its own axis in the counterclockwise direction (resp. clockwise direction), with the result that the vacant spaces 54 are contracted. The pressurized liquid fed out of the gerotor mechanism 18 is supplied, into one compartment (left or right, depending on the rotation direction of the steering wheel 20) of the steering cylinder 10.

Meanwhile, when the fluid paths are formed and when the rotor 18b of the gerotor mechanism 18 rotates on its own axis, this rotation is transmitted to the sleeve 16b through the dog bone 52 and the pin 50. The gerotor 18 therefore serves as a hydraulic turbine (or hydraulic motor).

The sleeve 16b is rotated in a follow-up manner relative to the rotation of the spool 16a and, when the steering wheel stops its rotation, the sleeve 16b and the spool 16a are brought to a neutral state, with the result that the supply of the pressurized liquid to the steering cylinder 10 is stopped.

Consequently, as long as the driver turns the steering wheel 20 (in the same direction), liquid is sent into one of the compartments (right or left) of the steering cylinder 10, and the piston moves. Even if the oil flow rate remains substantially constant, the quantity of liquid sent under pressure to the concerned compartment of the cylinder is substantially proportional to the amplitude of movement of the steering wheel 20. When the driver stops turning the steering wheel 20, the sleeve 16b returns in neutral position with respect to the spool 16a and there is no longer any liquid sent to the steering cylinder 10. The steering cylinder 10 is therefore somehow isolated from the rest of the oil circuit.

Control spool 16a of the control valve is rotated via the steering column in relation to control sleeve 16b. This opens cross-sections between the spool 16a and the sleeve 16b. The pressurized oil acts on the rotor 18 and sets the latter into motion. The oil is then fed via the rotor set to the steering cylinder. The rotation of the rotor acts on the sleeve 16b, which then follows the rotary movement of the spool 16a.

The size of the opened cross section depends on the speed of the steering wheel and/or on the steering pressure. If the steering movement is interrupted and the spool 16a is at a standstill, the oil, which still flows through the opened cross-sections to the rotor 18b, causes the rotor 18b and hence the sleeve 16b to continue to rotate a bit.

The rotary movement then causes the cross-section to close now, the rotor 18b also comes to a standstill and at the same time the steering cylinder 10 is in the desired position. A centering spring (not shown) brings and holds the spool 16a and sleeve 16b in a neutral position to each other.

In the event of an oil supply failure, the rotary valve operates as hand pump. In this operational state, oil can be sucked from the tank via a suction check valve, which prevents that air gets into the system. During normal operation, this valve also prevents shock or kick backs on the steering wheel caused by excessive external steering forces.

U.S. Pat. Nos. 4,514,152 and 4,665,695 disclose examples of rotary valves for a steering system, which means that such valve is well known from prior art.

Figure 6:
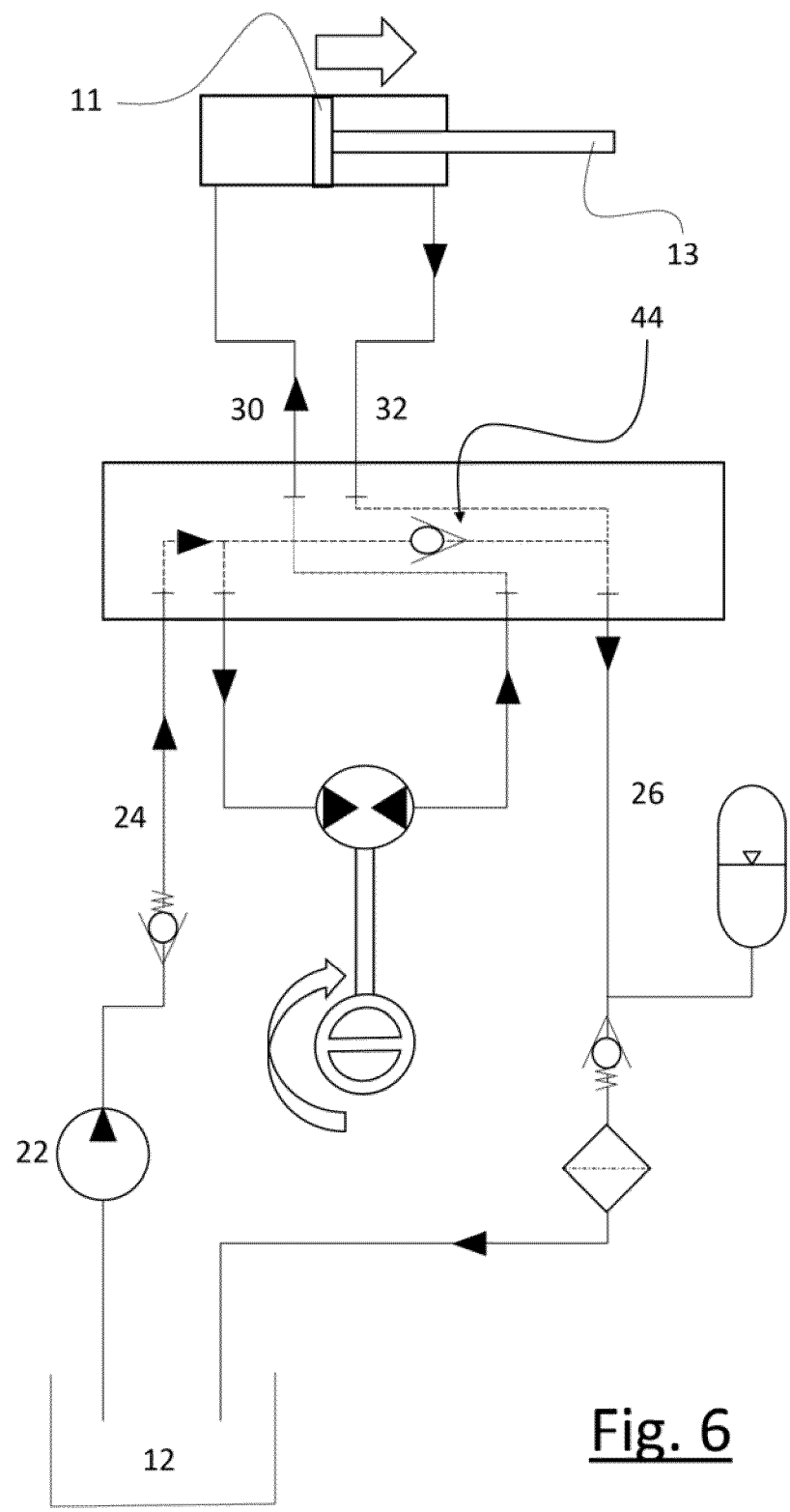
FIGS. 6 and 7 are views similar to FIG. 6 respectively representing a right turn configuration and a left turn configuration, with the hydraulic pump working.

FIG. 6 shows a right turn configuration. On FIG. 6, the path of liquid is represented by the arrows. In the right turn configuration, the movement of the steering wheel 20 in the clockwise direction makes the rotary valve 16 to connect the supply line 24 to the inlet side of the gerotor 18. Meanwhile, the control line 30 connected to the left compartment of the steering cylinder 10 is connected to the outlet side of the gerotor 18 (acting as a hydraulic motor). Also, the rotary valve 16 connects the control line 32 connected to the right compartment of the steering cylinder 10 to the return line 26.

Accordingly, pressurized liquid flows inside the left compartment of the steering cylinder 10, while liquid inside the right compartment flows back to the tank 12 through the return line 26. This leads to a movement of the piston 11 (and consequently of the piston rod 13) to the right direction, as shown by the big arrow above the cylinder 10.

Figure 7:
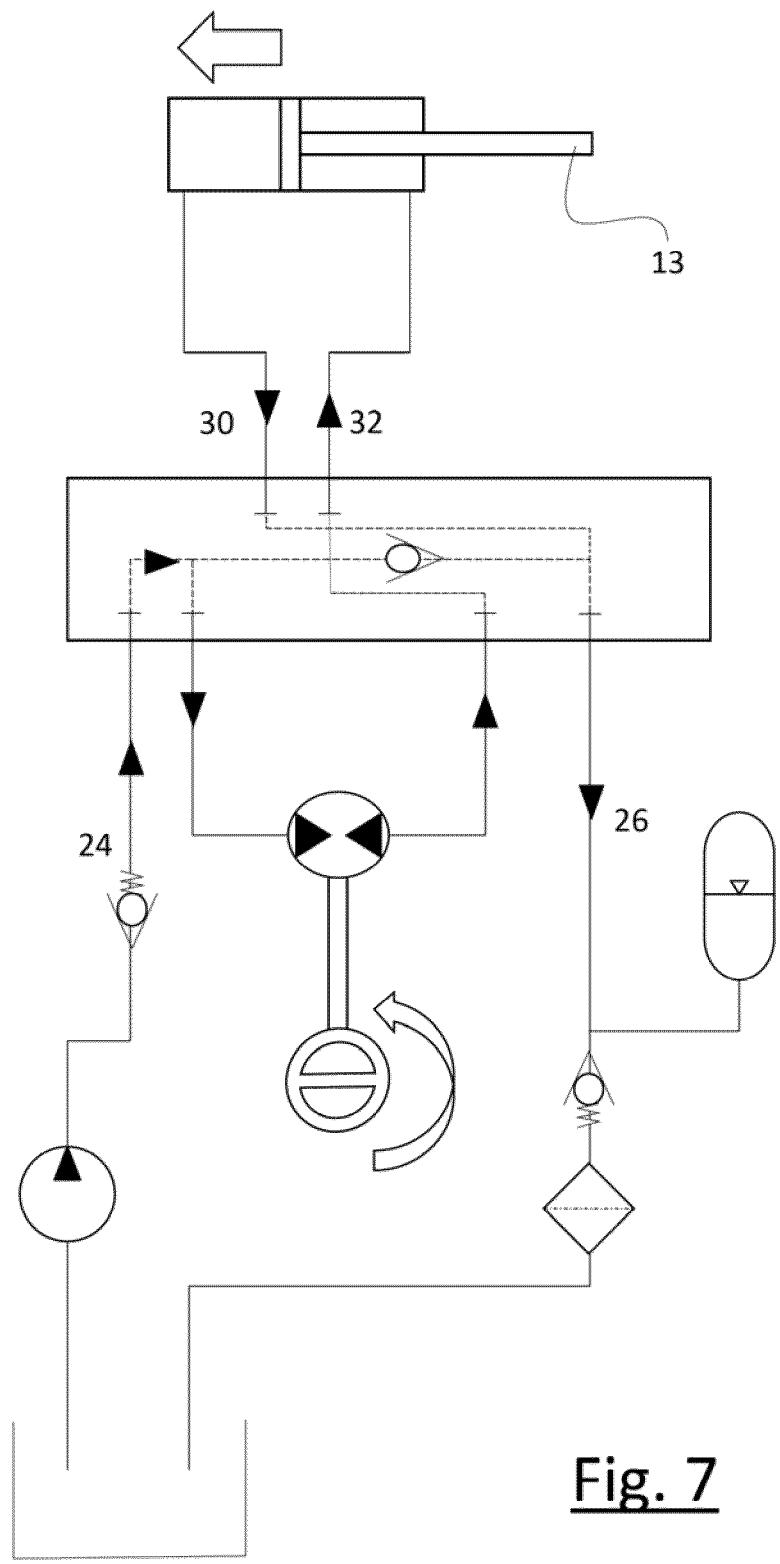

FIG. 7 shows a left turn configuration, in which the arrows also represent the path of liquid. In the left turn configuration, the movement of the steering wheel 20 in the counter-clockwise direction makes the rotary valve 16 to connect the supply line 24 to the inlet side of the gerotor 18. Meanwhile, the control line 32 connected to the right compartment of the steering cylinder 10 is connected to the outlet side of the gerotor 18 (acting as a hydraulic motor). Also, the rotary valve 16 connects the control line 30 connected to the left compartment of the steering cylinder 10 to the return line 26. Accordingly, pressurized liquid flows inside the right compartment of the steering cylinder 10, while liquid inside the left compartment is drawn back to the tank 12 through the return line 26. This leads to a movement of the piston 11 (and consequently of the piston rod 13) to the left direction.

When the hydraulic pump 22 for supplying pressurized liquid to the power steering apparatus 10 is not functioning or malfunctioning, the rotation of the spool 16*a* is transmitted to the inner rotator 18*b* of the gerotor through the pin 50 and the transmission link 52. In consequence of the rotation of the spool 16*a*, the gerotor mechanism 18 serves as a hydraulic pump (fail-safe function). Typically, the gerotor 18 can be used to pump liquid from one compartment of the steering cylinder 10 to the other compartment.

Figure 3:
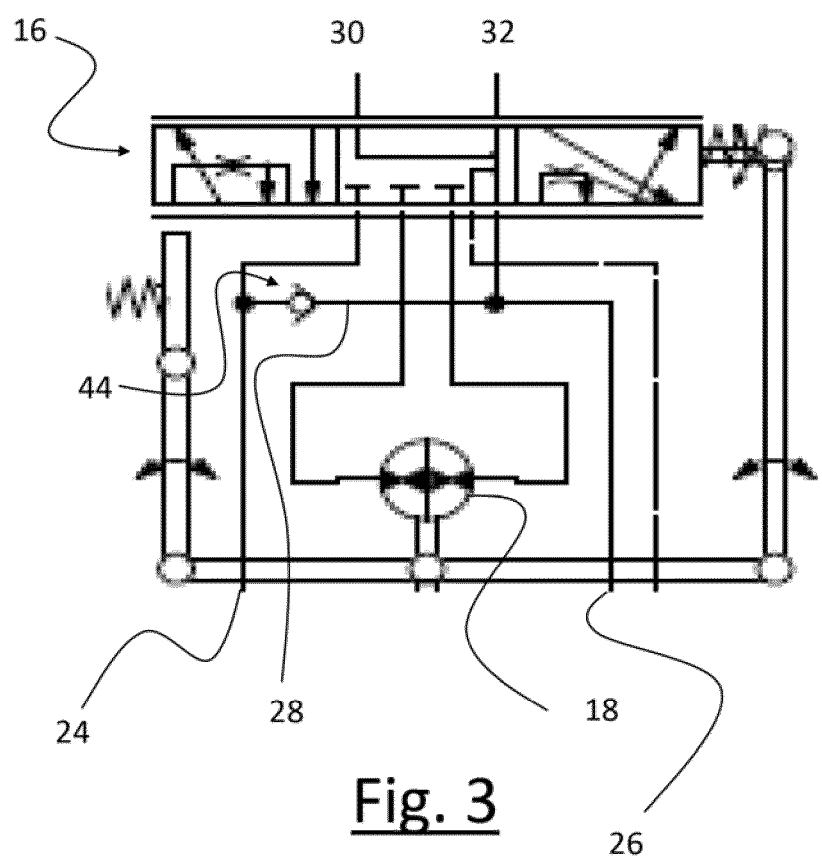
FIG. 3 is an enlarged view of FIG. 1, showing more specifically a schematics of the hydraulic steering unit of the system.

In this respect, the power steering system includes a recirculation line 28 connecting the return line 26 to the supply line 24. As show on FIGS. 3 and 6, a check valve 44 is arranged on said recirculation line 28 to prevent liquid from flowing from the supply line 24 to the return line 26.

In the example (See FIG. 5), an additional check valve 42, preferably a spring-loaded check valve, is arranged on the supply line 24 for preventing liquid from flowing from the steering unit 14 back to the pump 22.

In operation, the liquid that is drawn by the gerotor 18 acting as a hand pump does not flow back to the tank 12 but is recirculated in the system: In this respect, the gerotor 18 draws the liquid flowing in the return line 26, using the recirculation line 28. Pressurized liquid delivered in output of the gerotor 18 is sent to the opposed compartment of the steering cylinder to make the machine 4 turn.

Figure 8:
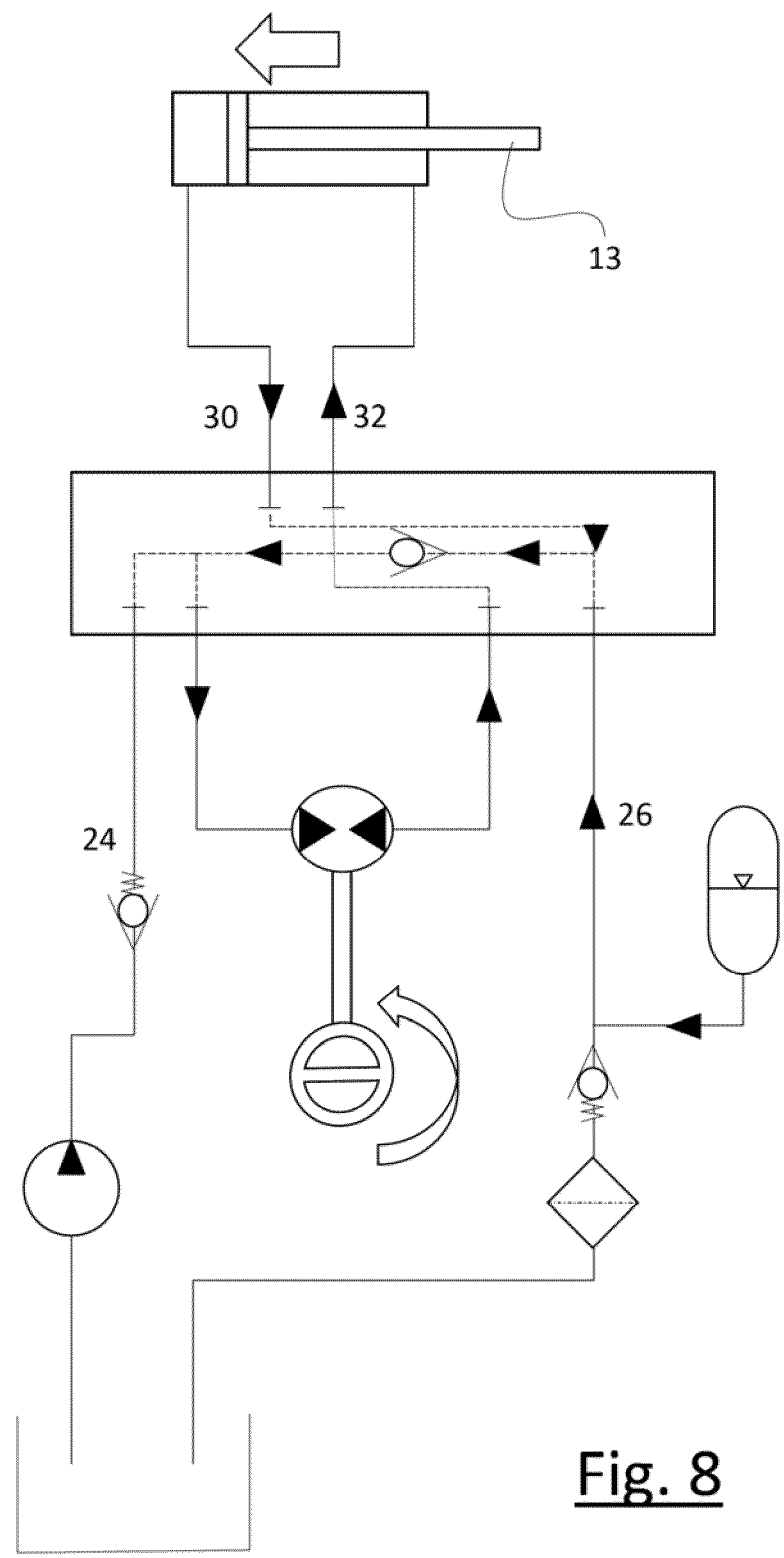
FIG. 8 is a view similar to FIG. 5, in which the hydraulic steering system is manually operated by the driver (hydraulic pump not working), more specifically to achieve a left turn.

FIG. 8 shows a configuration in which the supply line 24 is not pressurized, i.e. a configuration in which the hydraulic pump 22 is not able to pump any liquid from the tank 12 to the steering unit 14. For example, such configuration can happen when the battery (not shown) of the working machine 4 is discharged. On FIG. 8, the arrows also represent the path of liquid.

Precisely, FIG. 8 represents a configuration in which the steering wheel 20 is turned to the counter-clockwise direction (Left turn). In this configuration, the movement of the steering wheel 20 in the counter-clockwise direction makes the gerotor 18 to draw liquid from the left compartment of the steering cylinder 10, successively through the control line 30, the return line 26 and the recirculation line 28, and to pump it in direction of control line 32 to fill in the right compartment of the steering cylinder 10 with a pressurized liquid flow. In other words, the control line 32 connected to the right compartment of the steering cylinder 10 is connected to the outlet side of the gerotor 18 (acting as a hydraulic pump). Accordingly, pressurized liquid flows inside the right compartment of the steering cylinder 10, while liquid inside the left compartment is recirculated into the system, through the recirculation line 28. This leads to a movement of the piston (and consequently of the piston rod) to the left direction.

Given that there is no liquid pressure in the supply line 24, the steering wheel 20 can be difficult to turn. In order to help the driver to turn the steering wheel 20, the power steering system 2 further comprises a liquid accumulator 34 connected through a branch 35 to the return line 26. In detail, branch 35 extends between a connection point 38 arranged on the return line 26 and the accumulator 34.

The accumulator 34 includes one port connected to the branch 35. This port serves both for discharging the accumulated liquid and refilling the accumulator 34, when appropriate.

The liquid accumulator 34, which is an oil accumulator, creates a backpressure inside the return line 26, which makes the liquid inside the return line 26 easier to draw (or pump) by the gerotor 18 (in comparison with the systems of prior art in which no accumulator is arranged on the "tank line" side). In operation, pressurized liquid is therefore discharged from the accumulator 34 to the inlet side of the gerotor 18, successively through the tank line 26 and the recirculation line 28. The gerotor 18 then delivers a metered flow of liquid to the right compartment of the steering cylinder 10, through control line 32.

The size of the accumulator 34 is chosen to be superior to that of the steering cylinder 10, so that the accumulator 34 can never be emptied and can generate a backpressure during the whole range of displacement of the steering wheel 20.

The configuration in which the driver turns right (with no pressure in the pump line 24) is not described herein as such configuration is similar to that previously described, except that the rotary valve 16 connects the control line 32 to the tank line 26 and the control line 30 to the outlet of the gerotor 18.

In addition to helping the driver to turn when the hydraulic pump 22 is not operating, the accumulator 34 provides another advantage, which is to avoid the phenomenon of cavitation inside the steering cylinder 10.

In the example, the steering system of the machine 4 is built according to a non-reaction design, which means that, contrary to other road vehicles, such as trucks or passenger cars, the steering does not come back to a straight position after a turn, when the driver stops turning the wheel. In other words, the steering system does not react as a function of external forces, such as the ones applied by the road or coming from the own weight of the machine. As a matter of fact, when the driver stops turning the wheel 20, all orifices of the hydraulic system are closed off and the steering rod stays as it is: the steering angle does not change. The driver needs to move the steering wheel 20 in the opposite direction to move the front unit 8 back to a straight position relative to the rear unit 6.

In this configuration (non-reaction design of the steering system), when the driver tries to steer the machine while the hydraulic pump 22 is off (not operative), the metering device 18 draws oil from the compartment of the steering cylinder that is in compression and pumps oil to the compartment of the steering cylinder that is in expansion. Since oil is drawn from the compartment that is in compression, pressure unbalance occurs between the right and left compartments, which makes the piston to move. Without the additional source of pressurized liquid supplied by the accumulator, the metering device might not be able to convey enough oil inside the compartment that is in expansion in order to keep it full of liquid. In other words, the amount of liquid flowing inside the compartment in expansion might not be high enough to keep it full of liquid and some vacuum might appear. This can be especially critical when the volume of the compartment in expansion is much higher than that of the compartment in compression, i.e. when the steering angle increases.

However, with the additional source of liquid stored inside the accumulator 34, the latter can be used to supply the compartment of the steering cylinder that is in expansion with an additional amount of pressurized liquid, thereby avoiding any creation of vacuum inside the steering cylinder. Without any cavitation, the driver has the feeling that the wheels remain connected to the steering system, which complies with the requirements of the concerned regulation (ISO 5010).

In a variant not-shown, the steering system of the machine 4 can also be built according to a load-reaction design, which means that, as other road vehicles, such as trucks or passenger cars, the steering system reacts as a function of external forces, such as the ones applied by the road or coming from the own weight of the machine. In this configuration, the steering rod 13 can move as a function of external forces applying on the steering system. Accordingly, the piston 11 that is part of the steering rod 13 pushes liquid stored inside one compartment (in compression) and vacuum can appear in the other compartment (the one in expansion) if the amount of liquid that is simultaneously introduced into this compartment in expansion is not high enough to fill in the vacuum space. As for the non-reaction design, the accumulator 34 enables to make sure that enough liquid is pumped to the compartment in expansion and that no cavitation occurs.

Figure 9:
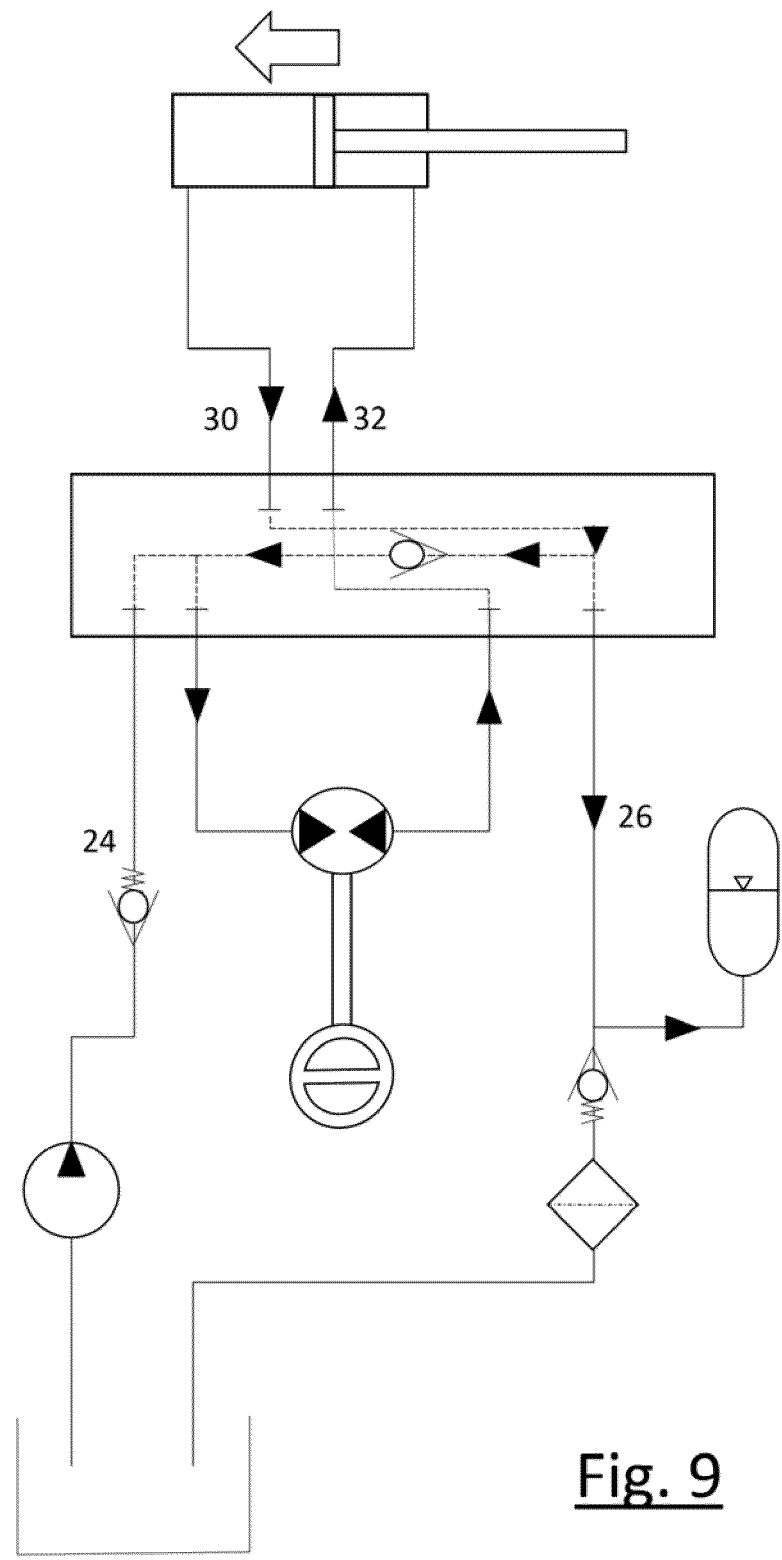
FIG. 9 is a view similar to FIG. 8, representing the configuration of the system at the end of the turn.

When the volume of the compartment that is in compression is bigger than that of the compartment that is in expansion, i.e. when the steering angle of the machine decreases, the amount of liquid to be pumped inside the compartment in expansion is lower than that which is needed to increase the steering angle. Accordingly, the liquid drawn from the compartment that is in compression is usually sufficient for feeding the other compartment of the steering cylinder 10, which means that it is no more necessary to draw liquid from the accumulator 34. In such configuration, which is represented on FIG. 9, no more liquid is drawn from the accumulator 34. More precisely, a portion of the liquid drawn from the compartment in expansion is recirculated in the system (through line 28), while the other portion flows back in the tank line 26 and can be used to recharge the accumulator 34.

This means that the accumulator 34 is not actively controlled: It is discharged and recharged automatically, depending on pressure conditions in the pump line 24. One can speak of a passive control.

Figure 5:
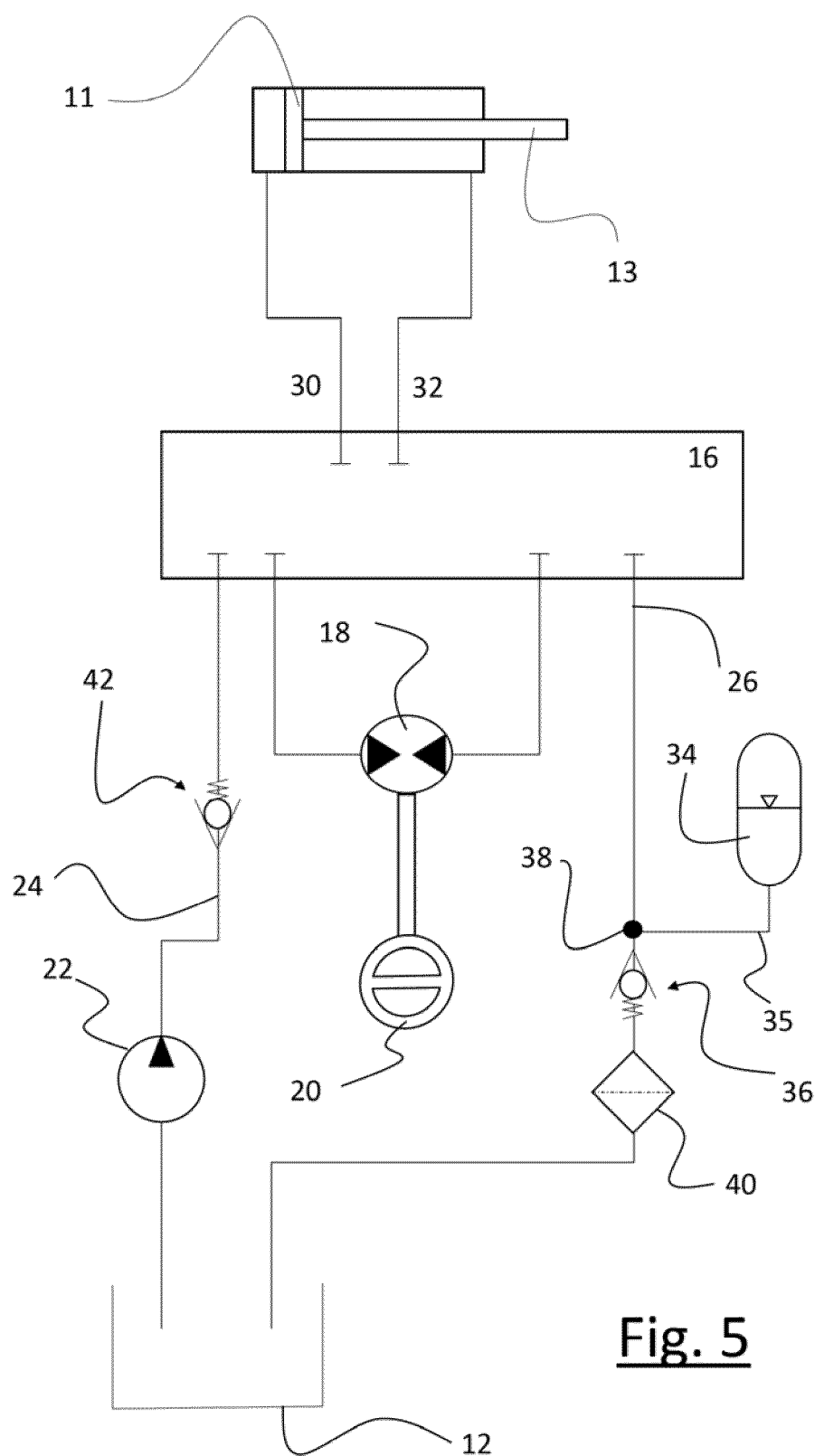
FIG. 5 is a simplified scheme of the power steering system, in a straight configuration (front axle parallel to rear axle)

As shown on FIG. 5, a relief valve 36 is advantageously arranged on the return line 26 between the liquid tank 12 and a connection point 38 of the accumulator 34. Preferably, the relief valve 36 is a spring-loaded check valve.

This relief valve 36 enables to create a backpressure inside the tank line 26. The relief valve 36 enables the liquid to flow from the steering unit 14 to the tank 12 only when a pressure threshold, e.g. 3 bar (relative pressure) has been reached. In other words, the relief valve 36 is designed to open at a predetermined set pressure, e.g. 3 bar. This is achieved by using a valve spring capable of providing enough force to maintain the valve 36 closed as long as the pressure upstream of the valve 36 is below said pressure threshold.

In the example, a liquid filter 40 is arranged on the return line 26 between the liquid tank 12 and the connection point 38 of the accumulator 34, preferably between the liquid tank 12 and the relief valve 36.

It is to be understood that the present invention is not limited to the embodiments described above and illustrated in the drawings; Rather, the skilled person will recognize that many changes and modifications may be made within the scope of the appended claims.

The invention claimed is:

1. A power steering system for a working machine, said power steering system comprising:
   at least one steering cylinder, comprising two compartments separated by a piston,
   a liquid tank,
   a steering unit comprising a steering valve and a metering device, for supplying one compartment of the steering cylinder with a metered flow of liquid,
   a hydraulic pump, for pumping liquid from the liquid tank to the steering unit through a supply line, a return line through which the liquid can flow from the steering unit back to the liquid tank,
   a recirculation line connecting the return line to the supply line, a check valve being arranged on said recirculation line to prevent liquid from flowing from the supply line to the return line,
   two control lines, respectively connecting the steering unit to the two compartments of the at least one steering cylinder,
   a liquid accumulator connected through a branch to the return line; and
   a relief valve arranged on the return line between the liquid tank and a connection point of the liquid accumulator, wherein the relief valve enables the liquid to flow from the steering unit to the liquid tank only when a pressure threshold has been reached.

2. The power steering system according to claim 1, wherein the relief valve is a spring-loaded check valve.

3. The power steering system according to claim 1, wherein a liquid filter is arranged on the return line between the liquid tank and the connection point of the accumulator between the liquid tank and the relief valve.

4. The power steering system according to claim 1, wherein the hydraulic pump is driven by an electric motor.

5. The power steering system according to claim 1, wherein the steering cylinder is a double acting cylinder.

6. The power steering system according to claim 1, wherein an additional check valve is arranged on the supply line for preventing liquid from flowing from the steering unit back to the pump.

7. The power steering system according to claim 1, wherein the volume of the accumulator is superior or equal to the volume of the steering cylinder.

8. The power steering system according to claim 1, wherein the steering valve is a rotary valve comprising an input shaft connected to a steering wheel.

9. The power steering system according to claim 8, wherein the metering device is a gerotor consisting of an inner rotor and an outer rotor and the inner rotor is mechanically linked to the input shaft.

10. The power steering system according to claim 1, wherein the system further includes a priority valve designed so that the hydraulic pump supplies the power steering system as a priority.

11. A working machine, wherein the working machine comprises a power steering system according to claim 1.

12. The working machine according to claim 11, wherein the working machine includes only one hydraulic pump.

13. The working machine according to claim 11, wherein the working machine includes a full electric powertrain.

14. The working machine according to claim 11, wherein the working machine is a wheel loader.

15. The working machine according to claim 11, wherein the working machine is an articulated wheel loader.

16. The working machine according to claim 11, wherein a liquid filter is arranged on the return line between the liquid tank and the connection point of the accumulator between the liquid tank and the relief valve.

17. The working machine according to claim 11, wherein the hydraulic pump is driven by an electric motor.

18. The working machine according to claim 11, wherein an additional check valve is arranged on the supply line for preventing liquid from flowing from the steering unit back to the pump.

19. The working machine according to claim 11, wherein the system further includes a priority valve designed so that the hydraulic pump supplies the power steering system as a priority.

* * * * *